United States Patent [19]

Handke

[11] Patent Number: 5,301,777
[45] Date of Patent: Apr. 12, 1994

[54] COMBINATION OF A VIBRATION DAMPER AND A CAP MEMBER

[75] Inventor: Günther Handke, Euerbach, Fed. Rep. of Germany

[73] Assignee: Fichtel & Sachs AG, Schweinfurt, Fed. Rep. of Germany

[21] Appl. No.: 99,253

[22] Filed: Jul. 29, 1993

Related U.S. Application Data

[63] Continuation of Ser. No. 917,837, Jul. 21, 1992, abandoned.

[30] Foreign Application Priority Data

Jul. 22, 1991 [DE] Fed. Rep. of Germany ... 9109019[U]

[51] Int. Cl.$^5$ .......................... F16F 9/32; B60G 15/00
[52] U.S. Cl. ................................ 188/322.17; 267/220
[58] Field of Search .................. 188/322.16, 322.17, 188/322.19, 322.12, 321.11; 267/220; 277/159, 181, 207 R

[56] References Cited

FOREIGN PATENT DOCUMENTS 3218829 11/1983 Fed. Rep. of Germany.
8605258.6 6/1986 Fed. Rep. of Germany.
9109020.2 11/1991 Fed. Rep. of Germany.

*Primary Examiner*—Douglas C. Butler
*Assistant Examiner*—Kevin D. Rutherford
*Attorney, Agent, or Firm*—Brumbaugh, Graves, Donohue & Raymond

[57] ABSTRACT

According to an illustrative example of the present invention, an end cap for a container of a vibration damper has a carrier sleeve. This carrier sleeve has an internal surface provided with axially extending ribs. The axially extending ribs have in a section containing the axis of the cap member an apex profile.

18 Claims, 4 Drawing Sheets

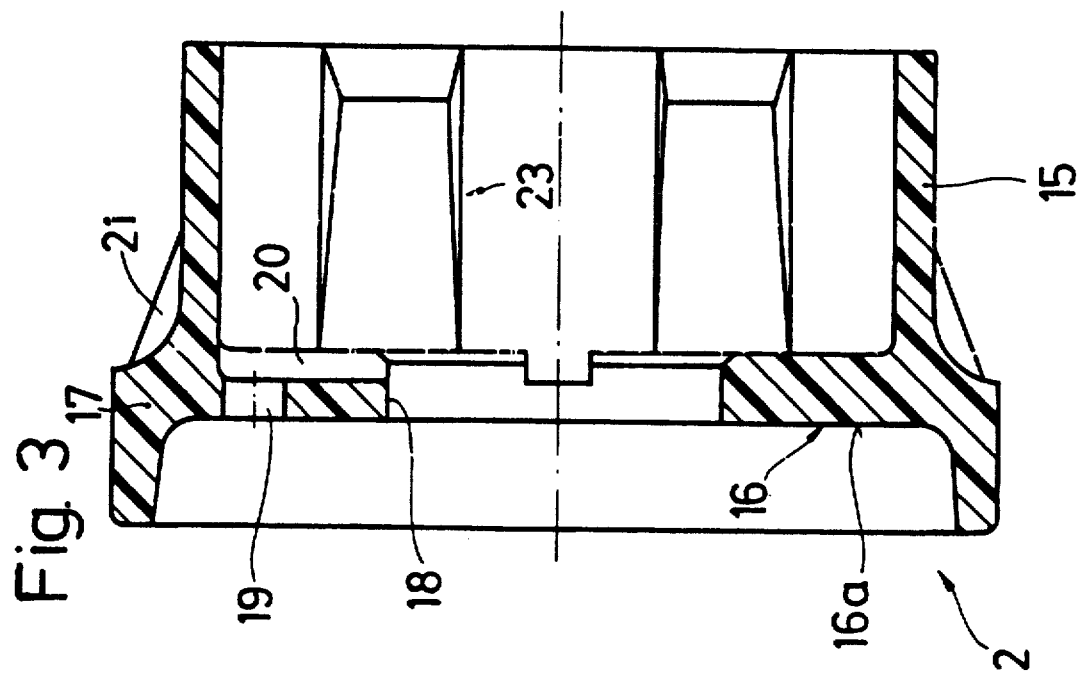
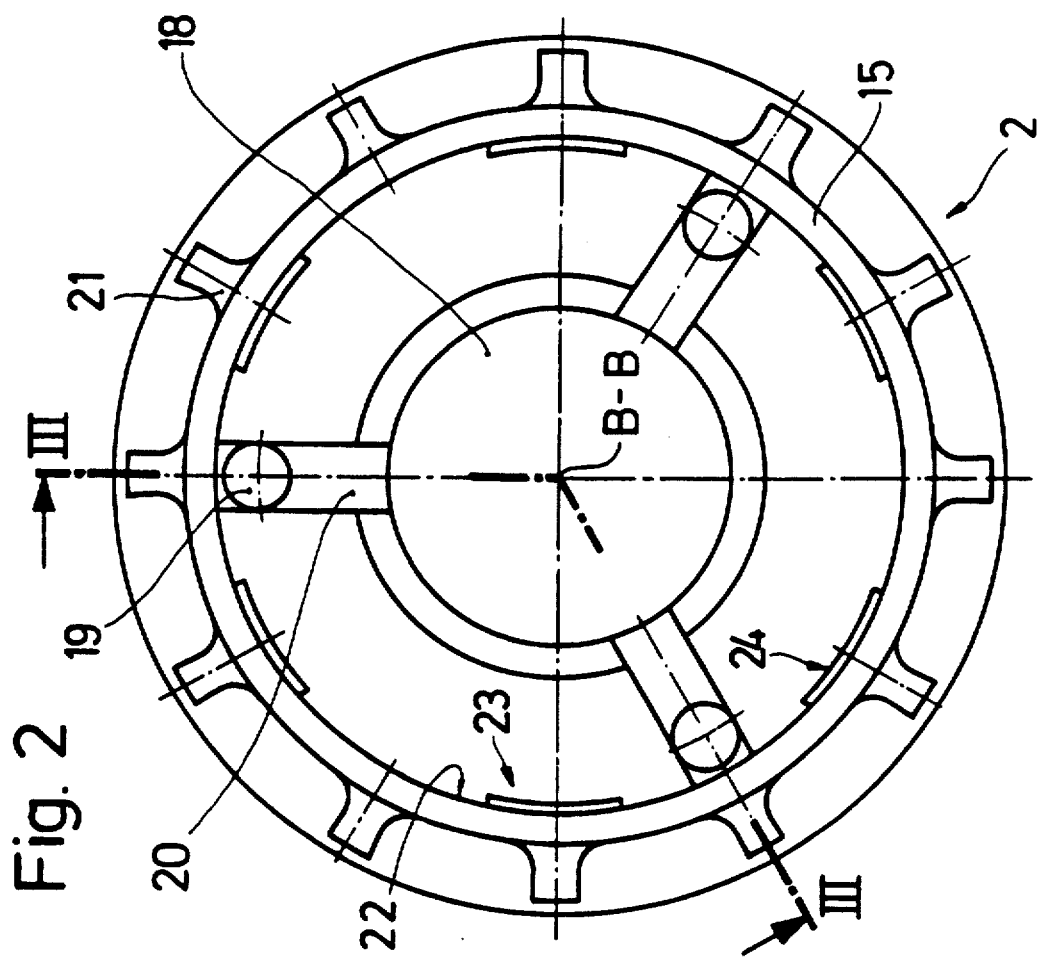

COMBINATION OF A VIBRATION DAMPER AND A CAP MEMBER

This application is a continuation of application Ser. No. 07/917,837, filed on Jul. 21, 1992, now abandoned.

BACKGROUND OF THE INVENTION

This invention refers to a combination of a vibration damper and a cap member, particularly for motor vehicles.

A vibration damper comprises a tubular container having an axis and two ends, a piston rod guiding and sealing unit provided adjacent a first one of said ends and a piston rod member axially movable through said piston rod guiding and sealing unit inward and outward of the container. The piston rod member is provided with a piston unit inside the container. The tubular container has an external cylindrical face at least axially adjacent the first one of the ends. The external cylindrical face has an external cylinder diameter.

STATEMENT OF THE PRIOR ART

It is known from German Patent Publication 32 18 829 to provide the container with a cap member. The cap member has a substantially sleeve-shaped carrier body of a resilient material with a cap axis and internal engagement face means engageable with the external cylindrical face of the container and an end wall.

It is desirable to fasten such a cap member by frictional engagement on the container of the vibration damper. In other words: The cap member is to be slipped onto the container by an axial pressing force. With increasing production quantities, it is desirable to allow larger tolerances both with respect to the container and with respect to the cap members, in order to facilitate production and to minimize the costs of production. Such increase of tolerances may lead to a combination of tolerance situations which result in a less acceptable coherence of the cap member and the container. Distortion of the cap member may occur, and this in turn will lead to unsightly appearance. A further problem is that some types of vibration dampers are enameled in the area to receive the cap member and other types are not enameled. Moreover, in addition, considerable difference in temperature based on regional, seasonal or even operational effects play an important role when calculating oversizing tolerances between the cap member and the container. In any case, a transmission force must prevail between the cap member and the container which is sufficiently great that the force of the weight of the vibration damper plus a safety margin is reliably existing, when the vibration damper is gripped at the cap member for being lifted. One apparently very obvious solution might reside in simply increasing the wall thickness of the cap member. However, this measure is ruled out by the very limited amount of space available. Customer requirements call for the outside diameter of the cap member not to be substantially increased.

OBJECT OF THE INVENTION

It is a primary object of the present invention to provide a combination of vibration dampers and cap members which can be combined even at high tolerances admitted for production of both the containers and the cap members. It is a further object to provide reliable engagement even in cases in which unfavourable combinations of containers and cap members occur. A further object is to provide cap members which can be easily manufactuered at low manufacturing costs. A further object of the invention is to provide cap members which have only a small excess of diameter as compared with the respective container.

SUMMARY OF THE INVENTION

A combination of a vibration damper and a cap member is provided.

The vibration damper comprises a tubular container having an axis and two ends. A piston rod guiding and sealing unit is provided adjacent a first one of the ends and a piston rod member is axially movable through said piston rod guiding and sealing unit inward and outward of the container. The piston rod member is provided with a piston unit inside the container. The tubular container has an external cylindrical face at least axially adjacent the first one of the ends. This external cylindrical face has an external cylinder diameter.

The cap member has a substantially sleeve-shaped carrier body of resilient material with a cap axis and internal engagement face means frictionally engageable with the external cylindrical face of the container and an end wall. The internal engagement face means are provided with slip-on facilitating face means adjacent an end of the sleeve-shaped carrier body which end is remote from the end wall. The internal engagement face means have radially inward directed projection means defining a minimum internal diameter of the internal engagement face means. This minimum internal diameter defined by said projection means is smaller than the external cylinder diameter of the external cylindrical face of the container. The radially inward directed projection means are resiliently displaceable by engagement with the external cylindrical face when slipping on the sleeve-shaped carrier body onto the external cylindrical face. The sleeve-shaped carrier body has relief zones adjacent the radially inward directed projection means facilitating resilient displacement of the radially inward directed projection means, when the sleeve-shaped carrier body is slipped onto the external cylindrical face by axial pressure.

When the cap member is pressed onto the external cylindrical face of the container, the material of the projection means can escape into the relief zones such that the overall shape of the cap member is less deformed and, nevertheless, a high coherence force is obtained in the areas of the projections. Such a reliable engagement is still obtained even in cases in which a vibration damper with a relatively small external cylindrical diameter is combined with a cap member having a relatively large internal minimum diameter. On the other hand, an unsightly appearance is even avoided in cases in which a container having a relatively large cylinder diameter is combined with a cap member having a relatively small minimum internal diameter. Moreover, in the latter case, the risk of damage to the cap member is avoided.

According to a first embodiment of the invention, the internal engagement face means are provided by a plurality of internal clamping ribs distributed along an internal circumference of the sleeve-shaped carrier body, the clamping ribs extending substantially in axial direction of the cap axis.

With such an embodiment based on clamping ribs, these clamping ribs may define—when regarded in a cross-sectional plane containing the cap axis—an engagement profile, this engagement profile being defined by a first profile line adjacent the end remote from the end wall and a second profile line adjacent the end wall, the first and the second profile lines define a radially inwards projecting apex. The first and the second profile lines may have a decreasing radial distance from the cap axis when proceeding from the apex in axial direction towards the end remote from the end wall and towards the end wall, respectively. The apices of the plurality of clamping ribs may define the minimum internal diameter of the internal engagement face means. The above defined profile simultaneously provides the above-mentioned slip-on facilitating face means. These slip-on facilitating face means are obtained by chamfering faces corresponding to the first profile lines. On the other hand, the apices as defined above can flow, when the cap member is slipped onto the container both in axial and circumferential direction such that a sufficient resilient engagement force in radial direction is obtained without overload onto the cap member.

The radially projecting apex may be in axial direction nearer to the end remote from the end wall than to the end wall. It has been found that this dimensioning is of considerable advantage for obtaining a high axial coherence between the cap member and the container.

The profile lines may be substantially rectilinear.

The first profile line may merge into an end face of the sleeve-shaped carrier body remote from the end wall through a first transition radius. This shape of transition further facilitates slipping-on of the cap member onto the container.

The second profile line may merge into a side face of the end wall through a second transition radius. This reduces local stress.

The first profile line may define a larger angle with the cap axis than the second profile line. This dimensioning is of considerable advantage for both facilitating the slip-on step and for increasing the axial coherence between the cap member and the container.

According to a further embodiment, the clamping ribs may have—when regarded in a sectional plane orthogonal to the cap axis—a middle area and radially inward projecting lateral areas on both sides of the middle area, the lateral areas being primarily engageable with the external cylindrical face of the container. The clamping ribs may further have side flanks, and the side flanks may be provided with hollow grooves. These hollow grooves are located substantially radially inward of the lateral areas. In this embodiment, the lateral areas can escape in radial outward direction thanks to the grooves. Thus, one again obtains sufficient local resilient engagement forces without distortion of the cap member as a total. It is to be noted that this second embodiment may be combined with the first embodiment. Also in the first embodiment, the ribs are provided with side flanks, and these side flanks may be provided with hollow grooves at least in the axial regions of the apices.

In the second embodiment, a middle area and the respective lateral areas may define a cylindrically curved surface having a radius smaller than the radial distance of the middle area from the cap axis.

In both embodiments, the clamping ribs may have a circumferential width abouth the cap axis which is substantially larger than the radial width of the sleeve-shaped carrier body at a location circumferential between subsequent clamping ribs. Thus, a relatively large total engagement face is obtained between the cap member and the external cylindrical face of the container with a reduced but still sufficient radial engagement pressure.

The container may surround a cylinder member. In this case, the piston unit may be located inside the cylinder member and may separate two working chambers inside the cylinder member. The cylinder member may have a bottom adjacent a second end of the container, and the cylinder member may be centered within the container by the piston rod guiding and sealing unit. This is the typical design of a so-called double-tube vibration damper which may be part of a spring leg.

The end wall may define an abutment face for a resilient cushioning member fastened to the piston rod member.

The abutment face may be provided by a cup-shaped end face of the end wall.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to the embodiments shown in the accompanying drawings in which

FIG. 2 shows an end view of a cap member in the direction of an arrow II of FIG. 1;

FIG. 3 is a section according to line III—III of FIG. 2;

DETAILED DESCRIPTION OF THE PREFERRED EMBODIMENTS

Figure 1:
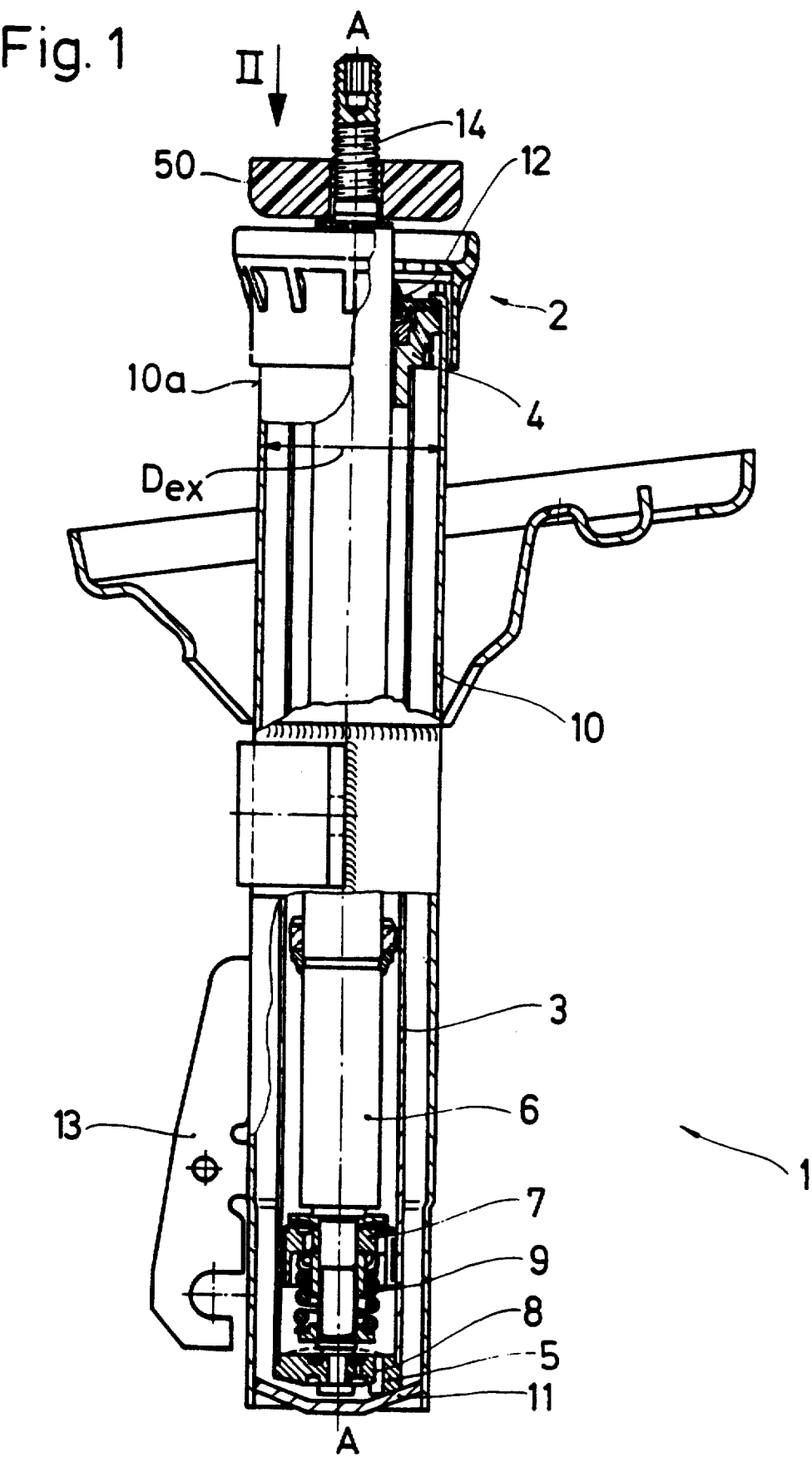
FIG. 1 shows a complete vibration damper in longitudinal section and in combination with a cap member mounted on a container thereof.

FIG. 1 shows a vibration damper 1 with a cylindrically tubular end cap 2 used in a spring leg. The vibration damper 1 consists essentially of a cylindrical tube 3 having an axis A—A closed at one end by a piston rod guiding and sealing unit and at the other by a cylindrically tubular end piece 5. A piston rod 6 with a piston 7 is capable of axial movement within the cylindrical tube 3. Throttling means 8,9 in the piston 7 and in the end piece 5 of the cylindrical tube 3 provide a damping force. Concentrically with the cylindrical tube 3 is a container 10 closed at one end by a container end member 11 and at the other end by the piston rod guiding and sealing unit 4. Mounted at the piston rod exit end of the vibration damper 1 is a cylindrically tubular end cap 2 which exercises a protective function for a piston rod seal 12 and a supporting function for a resilient cushioning member 50 fastened to the piston rod 6. Connection means 13, 14 provide for attachment on the axle structure or car body respectively.

FIGS. 2 and 3 show an overall view of a cylindrically tubular end cap 2. The cylindrically tubular end cap 2 consists essentially of a sleeve-shaped carrier body 15 and an end wall 16. An annularly circular safety abutment 17 can, according to the respective embodiment and installation situation of the vehicle be dispensed with. The end wall 16 provides an abutment surface 16a and a central bore 18 which allows passage for the piston rod 6 (FIG. 1). Additional bores 19 in conjunction with grooves 20 take over a venting and/or discharge function. To stabilize the end wall 16, the cylindrically tubular end cap 2 has reinforcing ribs 21 in the transition zone towards the sleeve-like carrier body 15. On an inner surface 22 of the sleeve-shaped carrier body 15 clamping ribs 23 are provided of which the clamping surfaces 24 have direct contact with an external cylindrical surface 10a of the container 10 (FIG. 1). When the cylindrically tubular end cap 2 is fitted onto the container 10, these clamping surfaces 24 are subject to a clearly defined radial prestress by virtue of dimensioning of the end cup 2 with respect to the container 10. This radial prestress which results in a radial pressure between the clamping surfaces 24 and the external cylindrical face 10a must be such that the friction forces acting between the container 10 and the clamping surfaces 24 are greater than or equal to the sum of the weight force of the vibration damper 1 plus a safety margin. These friction forces must be able of reliably fulfilling coherence requirements under all temperature situations and for any type of surface encountered on the container 10. In order to minimize the pressure per unit of surface area, the clamping surfaces 24 are relatively broad in circumferential direction.

Figure 4:
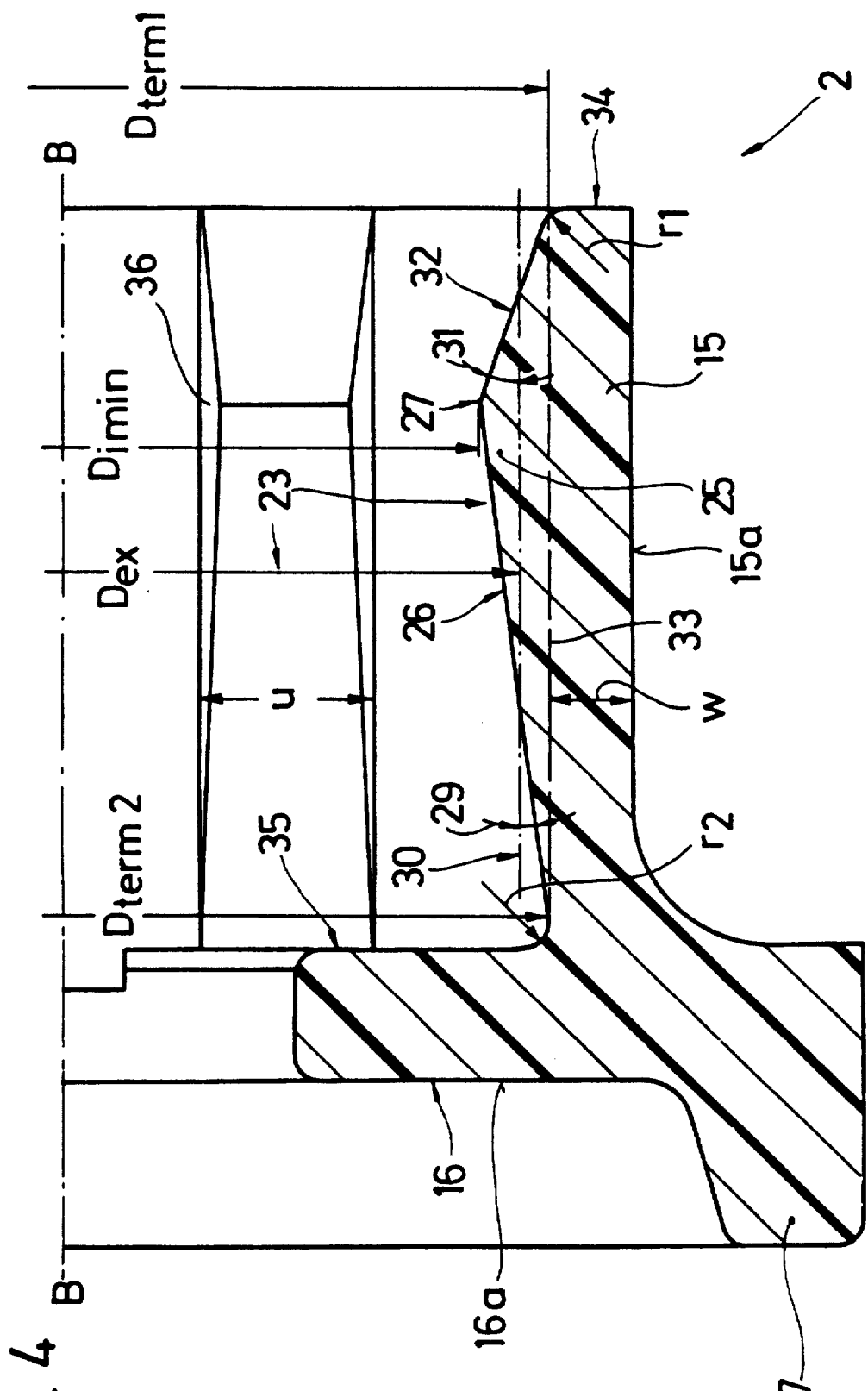
FIG. 4 is an enlarged part-sectional view corresponding to FIG. 3.

FIG. 4 clearly shows the essential idea underlying the invention. Each clamping rib 23 comprises a resilient zone 25 defined by sloping surfaces 26 and 32 forming an apex at 27. The apices 27 of the ribs 23 define a minimum internal diameter $D_{imin}$ which is also called the nominal diameter of the end cap 2. This minimum internal diameter $D_{imin}$ is smaller than the terminal diameters $D_{term1}$ and $D_{term2}$. The minimum internal diameter $D_{imin}$ is, before fitting the end cap 2 onto the container 10, smaller than the external diameter $D_{ex}$ of the external surface 10a of the container 10. The sloping surfaces 26 and 32 may be regarded in the sectional view of FIG. 4 as profile lines 26 and 32, 32 being a first profile line and 26 being a second profile line. A reference line 30 is indicated in FIG. 4 which is parallel to the axis B—B of the end cap 2. This reference line 30 has a distance from the axis B—B which corresponds to the external diameter $D_{ex}$. The end face of the end cap 2 is designated by 34 and an inner side face of the end wall 16 is designated by 35. The first profile line 32 merges into the end face 34 by a transition radius $r_1$ whereas the profile line 26 merges into the side face 35 through a transition radius $r_2$.

It is to be noted that the apex 27 is closer to the end face 34 than to the side face 35. It is further to be noted that the angle 31 between the first profile line 32 and the reference line 30 is larger than the angle 29 between the second profile line 26 and the reference line 30. The slope of the profile line 32 as indicated by the angle 31 may be understood as an introduction face for facilitating introduction of the upper end of the container 10 into the end cap 2. An interrupted line 33 indicates the basis of the rib 23 in FIG. 4 which corresponds to the inner surface 22. The distance of this interrupted line 33 from the external face 15a of the carrier body 15 corresponds to the wall thickness w of the carrier body 15 between circumferentially spaced clamping ribs 23. The end wall 16 provides a cup-shaped engagement face 16a for the cushioning member 50 as shown in FIG. 1.

When the carrier body 15 is slipped onto the external cylindrical face 10a of the container 10 the material adjacent the apex 27 and indicated by 25 is resiliently displaced radially outward and can simultaneously flow in axial direction towards the end face 34 and towards the side face 35. For obtaining a predetermened functional force between the container 10 and the carrier body 15 in axial direction which frictional force is greater than the weight force of the vibration damper plus safety margin a reduced pressure per unit of surface area is necessary and is obtained as compared with a design of carrier body 15 without the apex 27 and without the bi-directionally sloped area 25.

Experiments have shown that the reduction in the necessary maximum pressure per unit of surface area for obtaining the required coherence force between the container 10 and the carrier body 15 is more than 50 percent. The tolerance admitted for the diameter $D_{ex}$ and for the diameter $D_{imin}$ are up to 3/10 mm and preferably up to 5/10 mm.

Even in the worst case of combination of tolerances there is still a sufficient coherence force on the one hand and an acceptable deformation of the carrier body 15 on the other hand. It is to be noted that the circumferential width u of the ribs 23 is considerably larger than the wall thickness w of the carrier body 15. As a result, pressures per unit of surface area are further reduced.

Figure 5:
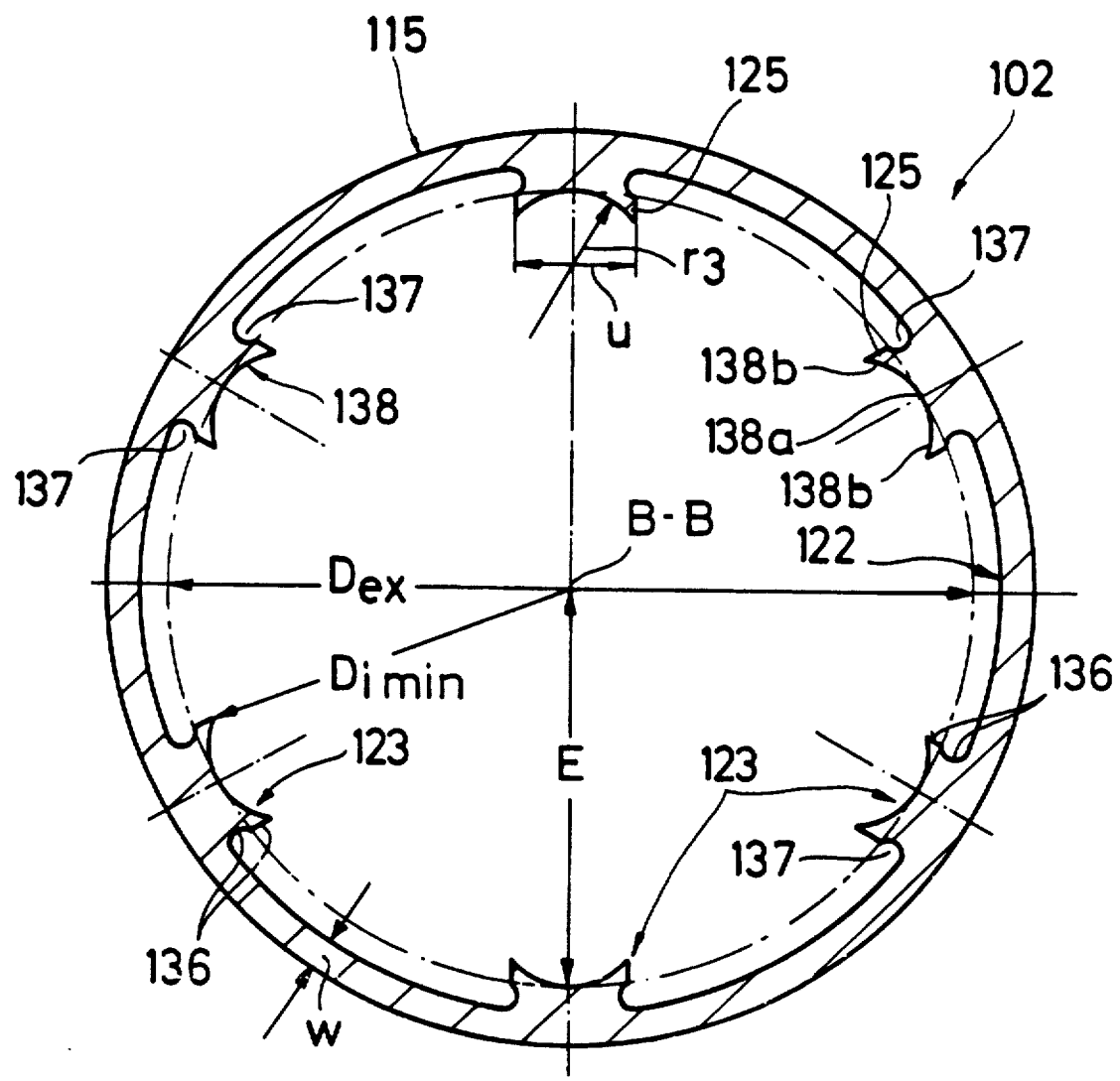
FIG. 5 is a section orthogonal to the cap axis with a further embodiment of the cap member.

In FIG. 5 analogous parts are designated by the same reference numerals as in FIGS. 1 to 4 increased by 100.

One can see again in FIG. 5 a plurality of ribs 123. These ribs 123 have cylindrically curved engagement surfaces 138. These engagement surfaces 138 have a middle area 138a and lateral areas 138b. As one can also see, the radius $r_3$ is substantially smaller than the radial distance E of the middle area 138a from the axis B—B. This radial distance E corresponds to the external diameter $D_{ex}$ of the container as shown in FIG. 1. The ribs 123 have side flanks 136. These side flanks 136 are provided with hollow grooves 137. The hollow grooves 137 are located radially inward of the lateral areas 138b. The lateral areas 138b form projections which are projecting radially inward beyond the circle with the diameter $D_{ex}$ such that these lateral areas 138b are displaced in radially outward direction when the carrier body 115 is pressed onto the container 10 of FIG. 1. The material of the projections formed in the lateral areas 138b can resiliently flow into the hollow grooves 137. It is to be noted again that the circumferential width u is considerably larger than the radial wall thickness w of the carrier body 115.

The profile of the ribs as shown in FIG. 5 can be combined with the design as shown in FIG. 4. More particularly, the grooves as indicated at 137 in FIG. 5 can be also provided in the lateral flanks 36 of FIG. 4 at least within the areas 25. It is to be noted, however, that the embodiment as shown in FIG. 5 can be provided also with ribs 123 which have substantially constant radial height along the carrier body 115. In such case it is only desirable to provide introduction facilitating slopes comparable to the slopes 33 at the end of the ribs 123 adjacent the end face corresponding to the end face 34 of FIG. 4.

When slipping the carrier body 115 onto the container 100 of FIG. 1 the radial inward projections 125 provided by the laterial areas 138b are displaced into the grooves 137. One has again found that even in the worst possible combinations of tolerances of the container and of the carrier body 115 a sufficient coherence force between the container and the end cap 102 is obtained on the one hand and no inacceptable deformation of the end cap 102 is obtained on the other hand.

In both embodiments according to FIGS. 4 and 5 the force necessary for slipping the carrier body onto the container is reduced.

The end cap 102 may be made of a wide range of easily available resilient materials such as plastic materials and elastomeric materials. Preferably polyacetal plastics like Delrin 100 of DUPONT or polypropylene PP5 may be used for manufacturing the end cap for example by injection moulding.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A combination of a vibration damper (1) and a cap member, said vibration damper (1) comprising a tubular container (10) having an axis and two ends, a piston rod guiding and sealing unit (4) provided adjacent a first one of said ends and a piston rod member (6) axially movable through said piston rod guiding and sealing unit (4) inward and outward of said container (10), said piston rod member (6) being provided with a piston unit (7) inside said container (10), said tubular container (10) having an external cylindrical face (10a) at least axially adjacent said first one of said ends, said external cylindrical face (10a) having an external cylinder diameter ($D_{ex}$), said cap member (2) having a substantially sleeve-shaped carrier body (15) of a resilient material with a cap axis (BB) and internal engagement face means (25) frictionally engageable with said external cylindrical face (10a) of said container (10) and an end wall (16), said internal engagement face means (25) being provided with slip-on facilitating face means (32) adjacent an end (34) of said sleeve-shaped carrier body (15) which end is remote from said end wall (16), said internal engagement face means (25) having radially inward directed projection means (27) defining a minimum internal diameter ($D_{imin}$) of said internal engagement face means (25), said minimum internal diameter ($D_{imin}$) defined by said projection means (27) being smaller than said external cylinder diameter ($D_{ex}$) of said external cylinder face (10a) of said container (10), said radially inward directed projection means (27) being resiliently displaceable by engagement with said external cylindrical face (10a) when slipping on said sleeve-shaped carrier body (15) onto said external cylindrical face (10a), said sleeve-shaped carrier body (15) having relief zones adjacent said radially inward directed projection means (27) facilitating resilient displacement of said radially inward directed projection means (27), when said sleeve-shaped carrier body (15) is slipped onto said external cylindrical face (10a), said internal engagement face means (25) being provided by a plurality of internal clamping ribs (23) distributed along an internal circumference of said sleeve-shaped carrier body (15), said clamping ribs (23) extending substantially in axial direction of said cap axis (BB), said clamping ribs (23) defining—when regarded in a cross-sectional plane containing said cap axis (BB)—an engagement profile (32, 27, 26), said engagement profile (32, 27, 26) being defined by a first profile line (32) adjacent said end (34) remote from said end wall (16) and a second profile line (26) adjacent said end wall (16), said first and said second profile lines (32, 26) defining a profile of said radially inward directed projection means (27) which is defined by a radially inward projecting apex (27), said first and second profile lines (32, 26) having a decreasing radial distance from said cap axis (BB) when proceeding from said apex (27) in axial direction towards said end (34) remote from said end wall (16) and towards said end wall (16), respectively, the apices (27) of said plurality of clamping ribs (23) defining said minimum internal diameter ($D_{imin}$) of said internal face means (25).

2. A combination as set forth in claim 1, said radially inwards projecting apex (27) being in axial direction nearer to said end (34) remote from said end wall (16) than to said end wall (16).

3. A combination as set forth in claim 1, said profile lines (32, 26) being substantially rectilinear.

4. A combination as set forth in claim 1, said first profile line (32) merging into an end face (34) of said sleeve-shaped carrier body (15) remote from said end wall (16) through a first transition radius ($r_1$).

5. A combination as set forth in claim 1, said second profile line merging into a side face (35) of said end wall (16) through a second transition radius ($r_2$).

6. A combination as set forth in claim 1, said first profile line (32) defining a larger angle (31) with said cap axis (BB) than said second profile line (26).

7. A combination as set forth in claim 1, said clamping ribs (123) having—when regarded in a sectional plane orthogonal to said cap axis (BB)—a middle area (138a) and radially inward projecting lateral areas (138b) on both sides of said middle area (138a), said lateral areas (138b) being primarily engageable with said external cylindrical face (10a) of said container (10), said clamping ribs (123) further having side flanks (136), said side flanks (136) being provided with hollow grooves (137), said hollow grooves (137) being located substantially radially inward of said lateral areas (138b).

8. A combination as set forth in claim 7, the middle area (138a) and the respective lateral areas (138b) defining a cylindrically curved surface portion (138) having a radius ($r_3$) smaller than the radial distance (E) of said middle area (138a) from said cap axis (BB).

9. A combination as set forth in claim 1, said clamping ribs (23,123) having a circumferential width (u) about said cap axis (BB) which is substantially larger than the radial width (w) of said sleeve-shaped carrier body (15) at a location circumferentially between subsequent clamping ribs (23,123).

10. A combination as set forth in claim 1, said container (10) surrounding a cylinder member (3), said piston unit (7) being located inside said cylinder member (3) and defining two working chambers inside said cylinder member (3), said cylinder member (3) having a bottom adjacent a second end of said container (10), said cylinder member (3) being centered within said container (10) by said piston rod guiding and sealing unit (4).

11. A combination as set forth in claim 1, said end wall (16) defining an abutment face (16a) for a resilient cushioning member (50) fastened to said piston rod member (6).

12. A combination as set forth in claim 11, said abutment face (16a) being provided by a cup-shaped end face (16a) of said end wall (16).

13. A combination of a vibration damper and a cap member, said vibration damper comprising a tubular container having an axis and two ends, a piston rod guiding and sealing unit provided adjacent a first one of said ends and a piston rod member axially movably through said piston rod guiding and sealing unit inward and outward of said container, said piston rod member being provided with a piston unit inside said container, said tubular container having an external cylindrical face at least axially adjacent said first one of said ends, said external cylindrical face having an external cylinder diameter ($D_{ex}$), said cap member having a substantially sleeve-shaped carrier body of a resilient material with a cap axis (BB) and internal engagement face means frictionally engageable with said external cylindrical face of said container and an end wall, said internal engagement face means being provided with slip-on facilitating face means adjacent an end of said sleeve-shaped carrier body which end is remote from said end wall, said internal engagement face means having radially inwards directed projection means defining a minimum internal diameter ($D_{i\ min}$) of said internal engagement face means, said minimum internal diameter ($D_{i\ min}$) defined by said projection means being smaller than said external cylinder diameter ($D_{ex}$) of said external cylindrical face of said container, said radially inwards directed projection means being resiliently displaceable by engagement with said external cylindrical face when slipping on said sleeve-shaped carrier body onto said external cylindrical face, said sleeve-shaped carrier body having relief zones adjacent said radially inwards directed projection means facilitating resilient displacement of said radially inwards directed projection means, when said sleeve-shaped carrier body is slipped onto said external cylindrical face, said internal engagement face means being provided by a plurality of internal clamping ribs distributed along an internal circumference of said sleeve-shaped carrier body, said clamping ribs extending substantially in axial direction of said cap axis (BB), said clamping ribs having—when regarded in a sectional plane orthogonal to said cap axis (BB)—a middle area and radially inwards projecting lateral areas on both sides of said middle area, said lateral areas being primarily engageable with said external cylindrical face of said container, said clamping ribs further having side flanks, said side flanks being provided with hollow grooves, said hollow grooves being located substantially radially inwards of said lateral areas.

14. A combination as set forth in claim 13, a middle area and the respective lateral areas defining a cylindrically curved surface portion having a radius ($r_3$) smaller than the radial distance (E) of said middle area from said cap axis (BB).

15. A combination as set forth in claim 13, said clamping ribs having a circumferential width (u) about said cap axis (BB) which is substantially larger than the radial width (w) of said sleeve-shaped carrier body at a location circumferentially between subsequent clamping ribs.

16. A combination as set forth in claim 13, said container surrounding a cylinder member, said piston unit being located inside said cylinder member and defining two working chambers inside said cylinder member, said cylinder member having a bottom adjacent a second end of said container, said cylinder member being centered within said container by said piston rod guiding and sealing unit.

17. A combination as set forth in claim 13, said end wall defining an abutment face for a resilient cushioning member fastened to said piston rod member.

18. A combination as set forth in claim 17, said abutment face being provided by a cup-shaped end face of said end wall.

* * * * *

UNITED STATES PATENT AND TRADEMARK OFFICE
CERTIFICATE OF CORRECTION

PATENT NO. : 5,301,777
DATED : April 12, 1994
INVENTOR(S) : Günther Handke

It is certified that error appears in the above-identified patent and that said Letters Patent is hereby corrected as shown below:

Col. 6, lines 6-7, "functional" should read --frictional--;
Col. 9, line 8, "movably" should read --movable--.

Signed and Sealed this

Thirtieth Day of August, 1994

Attest:

BRUCE LEHMAN

Attesting Officer

Commissioner of Patents and Trademarks